F. S. CARR.
STUD AND SOCKET FASTENER.
APPLICATION FILED AUG. 18, 1915.
1,188,896.
Patented June 27, 1916.
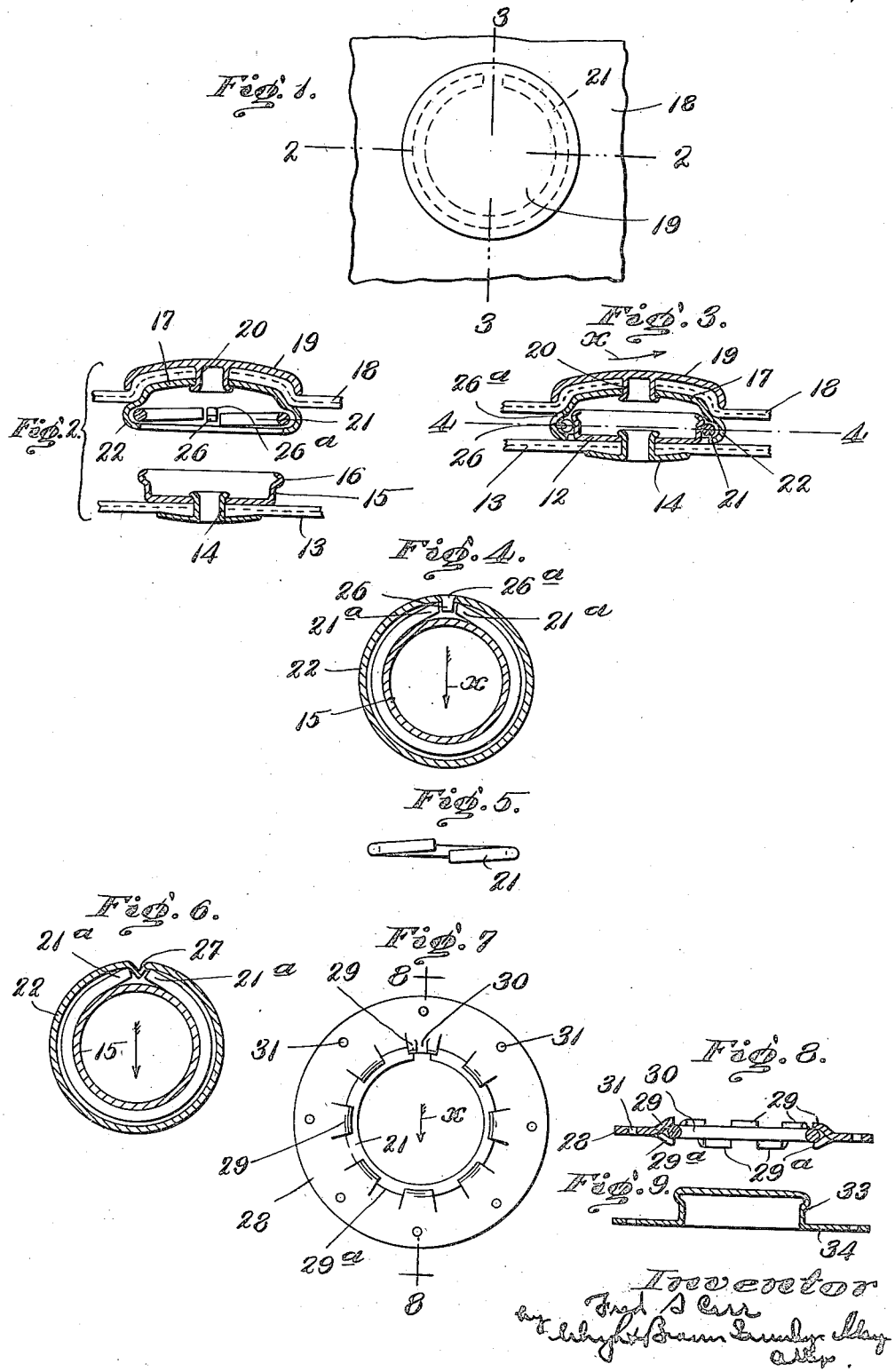

UNITED STATES PATENT OFFICE.

FRED S. CARR, OF BROOKLINE, MASSACHUSETTS, ASSIGNOR TO CARR FASTENER COMPANY, OF CAMBRIDGE, MASSACHUSETTS, A CORPORATION OF MAINE.

STUD-AND-SOCKET FASTENER.

1,188,896. Specification of Letters Patent. Patented June 27, 1916.

Application filed August 18, 1915. Serial No. 46,070.

*To all whom it may concern:*

Be it known that I, FRED S. CARR, a citizen of the United States, and resident of Brookline, in the county of Norfolk and State of Massachusetts, have invented certain new and useful Improvements in Stud-and-Socket Fasteners, of which the following is a specification.

This invention relates to a stud and socket fastener composed of a headed circular stud member attachable to a carrying part and a circular socket member composed of a body attachable to another carrying part and having an internally grooved mouth and a spring collar engaged with the grooved mouth and practically inseparable therefrom, and formed to yieldingly embrace the shank of the stud below its head and yieldingly resist separation of the stud from the socket. By collar I mean a resilient metal strip, usually of wire, bent to nearly surround an opening, the ends of the strip being separable from each other to enlarge the opening.

A fastener of this general character is already known and is shown for example by Letters Patent of the United States No. 1,070,113.

In a fastener of this type the spring collar must be expanded to permit the separation of the members, the diameter of the stud head being greater than the normal internal diameter of the collar, so that the collar, when contracted, forms a shoulder which prevents the withdrawal of the stud head from the mouth of the socket member. The head is formed to exert an expanding pressure on the collar when an outward or sidewise pull or strain is exerted on the socket member, so that the members are separable more or less easily by such sidewise pull or strain. By sidewise pull I mean a pull tending to lift the socket member sidewise from the stud member.

It has been found that the members are separable by an edgewise pull exerted in various directions on the socket member, although with more difficulty than by a sidewise pull, the direction of the separating edgewise pull being such that the body and the stud member coöperate in expanding the collar by separating its ends.

I have discovered that the collar is confined firmly against expansion when an edgewise pull (which I hereinafter call a collar-closing pull) is exerted on the socket member, this being a pull in such direction relatively to the ends of the collar as to cause the socket mouth to press inwardly on both ends of the collar and resist separation thereof, the fact being that the members cannot be separated without breakage by an edgewise pull or strain in this direction. I have utilized this discovery by securing the collar in the socket mouth in such manner as to prevent the collar from turning relatively to the mouth, and keep the ends of the collar in a predetermined location, so that by attaching the socket mouth to its carrier with reference to the location of the collar ends, and the direction of the collar-closing edgewise pull or strain, the fastener is enabled to positively resist an edgewise pull or strain in one direction. In other words, its members are inseparable by the edgewise pull or strain which they are intended to resist.

The invention consists in a fastener of the character stated, having means for preventing the spring collar from turning in the socket mouth.

The invention also consists in the means hereinafter described for preventing the collar from rattling or chattering in the mouth.

Of the accompanying drawings forming a part of this specification: Figure 1 represents a side view of a portion of a carrying part and the exterior of the attaching part of a socket member thereon; Fig. 2 represents a section on line 2—2 of Fig. 1, showing the socket and stud members disconnected; Fig. 3 represents a section on line 3—3 of Fig. 1, showing the stud and socket members connected; Fig. 4 represents a section on line 4—4 of Fig. 3; Fig. 5 represents an edge view of the spring collar; Fig. 6 represents a view similar to Fig. 4, showing the spring collar provided with tangential end portions; Fig. 7 represents a side view of a differently constructed socket member embodying my invention; Fig. 8 represents a section on line 8—8 of Fig. 7; Fig. 9 represents a sectional view of a stud member adapted to engage the socket member shown by Figs. 7 and 8.

The same reference characters indicate the same or similar parts in all the views.

As shown by Figs. 1, 2 and 3, the stud member is composed of an attaching base 12 secured to a carrying part 13 by suitable means such as a flanged eyelet 14, and a circular shank 15 having a beaded head 16, the height of the stud being considerably less than its diameter.

The socket member is composed of a body having a dished attaching base 17 secured to a carrying part 18 by suitable means such as a cap 19 having an eyelet 20 engaged with the wall of a central orifice in the base 17, and a spring collar 21 engaged with the body to be inseparable therefrom by ordinary usage, and nearly surrounding the stud-receiving mouth of the body.

The body includes an internally grooved circular flange 22, which forms the stud-receiving mouth and joins the dished base 17, the latter being formed to receive the stud head 16, as shown by Fig. 3.

The diameter of the stud head is considerably greater than the normal internal diameter of the collar 21, so that said head in passing through the collar expands the latter, the diameter of the stud shank 15 being such that it is closely embraced by the contraction of the collar upon it.

The normal external diameter of the collar 21 is greater and its normal internal diameter is less than the diameter of the edge portions of the groove in the flange 22. The diameter of the bottom or central zone of the said groove is greater than the normal diameter of the collar, so that the collar is confined against sidewise removal from the groove, is free to expand therein, and is adapted to yieldingly embrace the stud shank 15 and yieldingly engage the stud head 16 and hold the latter in the socket body.

The ends of the spring collar are spaced apart sufficiently to permit the interposition of a stop 26 between said ends. Said stop, which may be conveniently formed by punching inwardly a portion of the material of the grooved flange 22, prevents the collar from turning relatively to the body so that the ends of the collar always occupy a predetermined position relatively to the stop.

The socket member is adapted to be detached from the stud member by a direct outward pull or by a tipping pull exerted on the socket member, causing the stud head 16 to exert an expanding pressure on the collar. The socket member may also be detached from the stud member by an edgewise pull or strain on the socket member, if the direction of said strain relatively to the ends of the collar is such that said ends are not confined by the casing and are free to be forced apart by a wedging action of the stud head 16 against the interior of the collar. I have discovered however that when the direction of the edgewise strain relatively to the ends of the collar is that indicated by the arrow $x$ (Figs. 3 and 4) the grooved flange 22 is pressed inwardly against the ends of the collar and so confines said ends that the collar cannot be expanded by the wedging action of the stud head while said pull, which is the collar-closing pull above mentioned, is exerted. The members are therefore absolutely inseparable (unless breakage occurs) by said collar-closing pull.

It will now be seen that by providing means, such as the stop 26, for preventing the collar from turning in the casing, I am enabled, in attaching the socket member to its carrier, to so locate the ends of the collar that the chief edgewise strain to which the fastener is subjected when in use will positively prevent the expansion of the collar and the separation of the members.

For convenience in locating the ends of the collar relatively to the spring-closing pull when the socket member is being applied to its carrier, I provide an externally visible indicator for identifying the position of said ends. Said indicator may be the opening 26$^a$ formed by the operation of punching the flange 22 in forming the stop 26.

To prevent the collar 21 from rattling or chattering in the casing I deflect its end portions in opposite directions so that they are normally offset or out of alinement with each other, as indicated by Fig. 5. The collar ends are thus caused to bear simultaneously and yieldingly against the side portions of the groove in the flange 22, and prevent loose sidewise play of the collar in the groove.

In Figs. 4 and 6 I show the spring collar provided with tangentially arranged end portions 21$^a$ projecting outwardly into contact with the socket mouth. While the end portions thus arranged do not interfere with the expansion of the collar by a sidewise pull and by an edgewise pull in various directions, they make the collar-confining pull in the direction of the arrow $x$ very effective, there being no lost motion between the socket mouth and the collar ends. This form of collar may be prevented from turning in the casing by a boss 27 formed on the casing flange 22 and projecting inwardly between the end portions 21$^a$, as shown by Fig. 6.

Figs. 7, 8 and 9 show a modified form of fastener in which my invention may be embodied. The body portion of the socket member in this embodiment is a sheet metal ring 28 radially slotted from its inner edge partly to the outer edge to form tongues 29, 29ª, which are bent outwardly in opposite directions from the plane of the ring and are formed so that collectively they constitute an equivalent of the grooved flange 22. The spring collar coöperates with the ears 29, 29ª in the same manner that it coöperates with the flange 22, and may be prevented from turning by a boss 30, formed on one of said ears and projecting between the ends of the collar. This form of socket member is useful for placket fasteners and its body portion may be attached by stitches engaged with orifices 31 in the ring 28. A stud member 33 formed as shown by Fig. 9 may be used with the socket member last described, said stud member having a sheet metal attaching base 34 adapted to be secured by stitches.

Having described my invention, I claim:

1. A stud and socket fastener comprising a socket member composed of a body attachable to a carrying part and having an internally grooved annular socket mouth, a spring collar engaged with and expansible in the groove of said mouth, and adapted to yieldingly engage a headed stud inserted therein, means being provided for confining the collar against rotation and locating its ends in a predetermined relation to the socket mouth, and a circular stud member attachable to another carrying part and having a shank portion formed to be closely embraced by the collar, and a head portion of greater diameter, the collar being expansible to release the stud member by a sidewise outward strain on the socket member and by edgewise strains on the socket member in various directions, and confined against expansion by an edgewise strain on the socket member in a direction which causes the socket mouth to confine the ends of the collar against expansion.

2. A stud and socket fastener comprising a socket member composed of a body attachable to a carrying part and having an internally grooved annular socket mouth, a spring collar engaged with and expansible in the groove of said mouth, and adapted to yieldingly engage a headed stud inserted therein, the end portions of the collar being formed to bear yieldingly on the socket mouth while other portions of the collar are normally free to expand therein, means being provided for confining the collar against rotation and locating its ends in a predetermined relation to the socket mouth, and a circular stud member attachable to another carrying part and having a shank portion formed to be closely embraced by the collar, and a head portion of greater diameter, the collar being expansible to release the stud member by a sidewise outward strain on the socket member and by edgewise strains on the socket member in various directions, and confined against expansion by an edgewise strain on the socket member in a direction which causes the socket mouth to confine the ends of the collar against expansion.

3. A stud and socket fastener comprising a socket member composed of a body attachable to a carrying part and having an internally grooved annular socket mouth, a spring collar engaged with and expansible in the groove of said mouth, and adapted to yieldingly engage a headed stud inserted therein, means being provided for confining the collar against rotation and locating its ends in a predetermined relation to the socket mouth, and a circular stud member attachable to another carrying part and having a shank portion formed to be closely embraced by the collar, and a head portion of greater diameter, the collar being expansible to release the stud member by a sidewise outward strain on the socket member and by edgewise strains on the socket member in various directions, and confined against expansion by an edgewise strain on the socket member in a direction which causes the socket mouth to confine the ends of the collar against expansion, the socket body being provided with an external indicator for identifying the location of the ends of the spring collar.

4. A stud and socket fastener comprising a socket member composed of a body attachable to a carrying part and having an internally grooved annular socket mouth, a spring collar engaged with and expansible in the groove of said mouth, and adapted to yieldingly engage a headed stud inserted therein, the socket body being provided with a stop which projects between the ends of the collar to prevent the latter from turning in the casing, and a circular stud member attachable to another carrying part and having a shank portion formed to be closely embraced by the collar, and a head portion of greater diameter, the collar being expansible to release the stud member by a sidewise outward strain on the socket member and by edgewise strains on the socket member in various directions, and confined against expansion by an edgewise strain on the socket member in a direction which causes the socket mouth to confine the ends of the collar against expansion.

5. In a stud and socket fastener, a socket body having an internally grooved annular socket mouth and an annular spring collar engaged with the groove of said mouth, the end portions of the collar being laterally deflected in opposite directions to bear simultaneously and yieldingly on opposite sides of said groove and prevent rattling of the spring.

6. In a stud and socket fastener, a socket body having an internally grooved annular socket mouth, and a spring collar engaged with the groove of said mouth, the main portion of the collar being a nearly complete circle of smaller diameter than the central zone of the grooved mouth, and its end portions projected outwardly into contact with said mouth.

In testimony whereof I have affixed my signature.

FRED S. CARR.